Patented Oct. 20, 1925.

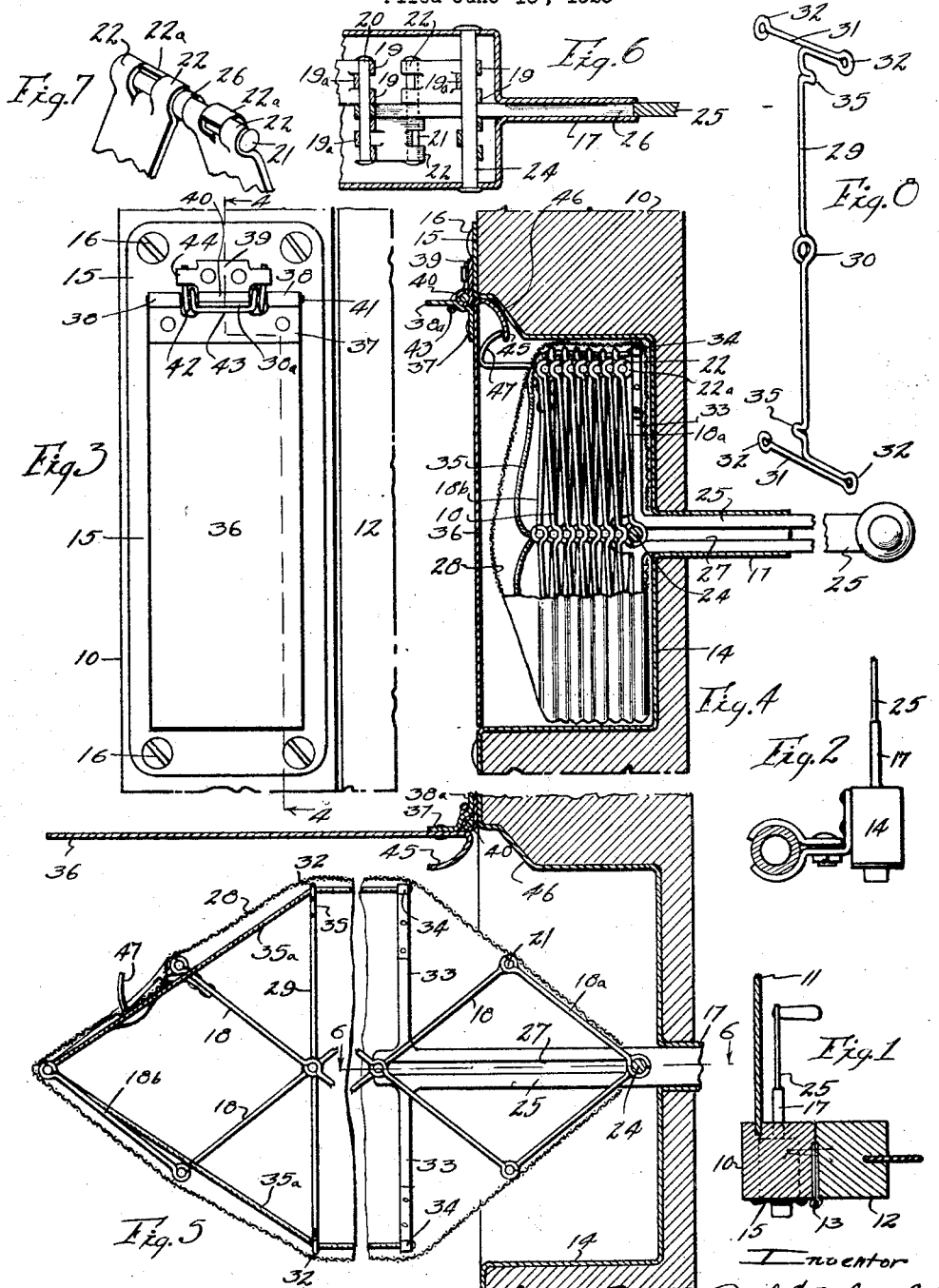

1,558,183

UNITED STATES PATENT OFFICE.

PAUL C. KLINGBEIL, OF REMSEN, IOWA.

VEHICLE SIGNAL.

Application filed June 16, 1925. Serial No. 37,434.

*To all whom it may concern:*

Be it known that I, PAUL C. KLINGBEIL, a citizen of the United States, and a resident of Remsen, in the county of Plymouth and State of Iowa, have invented certain new and useful Improvements in a Vehicle Signal, of which the following is a specification.

My invention relates to a traffic signal, and it is my object to provide a signal having an indicating member which may be retracted when it is withdrawn to inoperative position into a position occupying a minimum of space, whereby the said indicating member may be entirely contained within a casing adapted to be mounted in the door post of an enclosed vehicle, and entirely concealed from sight.

More particularly, my invention contemplates a structure wherein a lazy tongs structure is pivoted at one of its extreme central pivots to a casing and has one of its intermediate central pivots secured to, and carried by, an operating arm, which is mounted in the casing for longitudinal sliding movement, and held against lateral movement, whereby the lazy tongs structure may be projected in a straight path from the casing.

Another object is to provide a cover, hinged to the casing, adapted to close the same, the movement of the lazy tongs structure, when being projected or retracted, serving to open and close the cover respectively.

Another object is to provide a fabric envelope surrounding the lazy tongs structure, together with means for maintaining the lateral fullness of the envelope as the lazy tongs is projected outwardly.

With these and other objects in view, my invention consists in the construction, arrangement and combination of the various parts of my device, whereby the objects contemplated are attained, as hereinafter more fully set forth, pointed out in my claims and illustrated in the accompanying drawings, in which:

Fig. 1 is a horizontal sectional view through a portion of the door post and windshield of a vehicle, illustrating the position in which the signal member is attached.

Fig. 2 is a similar sectional view through the windshield post of an open vehicle, illustrating a slightly modified form of the device attached thereto.

Fig. 3 is an elevation from the exterior side of the vehicle door post, illustrating the outer side of the casing and the cover member.

Fig. 4 is a vertical longitudinal sectional view through the door post and the signal installed therein, taken as indicated on the lie 4—4 of Fig. 3.

Fig. 5 is a similar sectional view showing the two extremities of the lazy tongs structure in extended position.

Fig. 6 is a detail sectional view taken as indicated by the line 6—6 of Fig. 5, the lazy tongs structure being shown in partly projected position.

Fig. 7 is a perspective view, illustrating the extremity of a path of the lazy tongs links, illustrating their method of connection.

Fig. 8 is a detail perspective view of one of the spacing ribs.

I have used the reference character 10 to indicate generally the door post of an enclosed vehicle, having the windshield, 11, and the forward door, 12, hinged at 13 to the post, 10. My signal is provided with a casing, 14, which may be of sheet metal or a casting, and which is provided at its open outer side with a flange, 15, through which wood screws, 16, are received in order to secure the casing to the post, 10.

The post is provided with a socket to receive the casing, 14, in a manner similar to the installation of an ordinary door lock. The rear side of the casing, 14, is formed with a sleeve, 17, which projects inwardly through the post and into the interior of the vehicle.

The movable indicating member comprises generally a lazy tongs structure, formed of flat steel links, 18, and half links, $18^a$ and $18^b$, at the inner and outer extremities thereof, respectively. Each of the links, 18, is split at its center to provide the three webs, 19 and $19^a$, (see Fig. 6), the former being pressed in one direction and the latter in the other direction to form a closed loop, serving as a hub for the link. The webs $19^a$, are adapted to be received within the space between the webs, 19, of the adjacent link when the lazy tongs structure is closed. (See Fig. 4.) Thus the links may be folded into a very small space when the lazy tongs structure is retracted.

As shown in Fig. 6, the links 18, are pivoted, edge to edge, by means of central pivots, 20 and the outer ends thereof secured together in the same manner by means of connecting pivots, 21. The outer ends of the links, 18 and 18ª, are each provided with hinge loops, which are formed by splitting the ends into three webs, 22 and 22ª, and bending the respective webs, 22 and 22ª, in opposite directions to form closed loops, as shown in Fig. 7. The webs, 22ª and 22, of the adjacent links are adapted to intermesh in a manner similar to that of the central hub loops.

By thus intermeshing the hinge loops and disposing the links with their flat faces adjacent each other a minimum of space is required to house the indicating member when in closed position.

The ends of the half links, 18ᵇ, are connected by a pivot, 23, and the ends of the half links, 18ª, are pivotally mounted on a shaft, 24, which is secured at its ends in the sides of the casing, 14, as shown in Fig. 6.

A flat arm, 25, is slidably mounted in the sleeve, 17, and has its inner end received between the inner edges of the two sets of lazy tongs links. In order to accommodate the arm, 25, between the links the same are spaced apart at all of their pivots except the stationary pivot, 24, and the next adjacent central pivot by means of small washers, 26.

The arm, 25, is provided with a longitudinal slot, 27, which receives the pin, 24, and allows sliding movement of the arm relative thereto. The pivot pin, 20, which is next adjacent to the shaft, 24, is secured in the end of the arm, 25, so that movement of the arm, 25, longitudinally will transmit movement to the lazy tongs structure, tending to project the same. (See Fig. 5.)

The sleeve, 17, is of considerable length so that the arm, 25, is rigidly held against lateral movement, and it thus serves to support the lazy tongs structure against sagging as it is projected outwardly and causes it to move in a straight path.

The fabric envelope, 28, encloses the lazy tongs structure, and as the same is retracted to closed position it will fold accordian-like therewith.

In order to prevent the folds catching between the links of the lazy tongs and to maintain a constant width as the signal is extended, I provide a number of ribs, 29, which may be made of wire, having loops, 30, at their centers, by means of which the ribs, 29, are pivoted to the central pivot pins, 20, and at their outer ends being formed with cross members, 31. The outer ends of the cross members are looped, as at 32.

The arm, 25, is provided with a pair of vertical arms, 33, at the ends of which are a similar pair of cross arms, provided at their ends with loops, 34.

Cables, 35, are secured in the loops, 34 and 32, and at their forward ends are brought together and secured to the forward hinge pin, 23.

It will be seen that the arms, 31, space the cables apart sufficiently to embrace the sides of the lazy tongs links.

A rib, 29, is provided for each of the pivot pins, 20. (See Fig. 4.)

In order to maintain the ribs in positions perpendicular to the path of movement of the lazy tongs structure, they are provided with laterally-extending lugs, 35ª, which will be engaged between the faces of the adjacent links as the lazy tongs structure is brought to closed position. When in extended position the tightening of the cables, 35, serves the same purpose.

A cover, 36, of sheet metal is provided at its upper end with a hinge element, 37, having the spaced hinge loops, 38, at its extremities, and having its central portion bent laterally, as at 38ª. A coacting element, 39, is secured to the flange, 15, and has a coacting hinge loop, 40, adapted to be received between the loops, 38.

A pin, 41, connects the hinge elements together in order to hinge the cover, 36, to the casing. When the cover is swung to horizontal position, as shown in Fig. 5, the member, 38, will contact with the upper hinge element, 39, and limit the upward movement of the cover.

The cover is urged toward this horizontal position by means of a spring, coiled as at 42, around the pin, 41, between the loops, 38 and 40, having a portion received under the member, 38, as at 43, and having its ends secured under hooks, 44 on the upper hinge element, 39. (See Fig. 3.)

The hinged end of the cover, 36, is provided with an inturned lip, 45 which, when the cover is closed, is received in a pocket, 46, provided in the casing, 14, for that purpose.

A hook, 47, is secured to the upper end of one of the outer links, 18. The two hooks are so positioned and formed that as the lazy tongs structure is moved inwardly, the hook, 47, will engage the hook, 46, in the position shown in Fig. 5, and will draw the cover closed to the position shown in Fig. 5. When the cover has reached its vertical position, it will be engaged against the hook, 47, as shown in Fig. 4, and limited from further movement.

By forming the two hooks of resilient material, the parts may be so arranged that when the lazy tongs structure is completely closed, the two hooks may be sprung outwardly somewhat by their mutual engagement and the cover thus locked against rattling by the tension thus imposed.

The advantages of the device over other structures lie chiefly in the compactness which allows the signal to be entirely hidden within the door post when in retracted position, the neatness of appearance which is occasioned by the closing of the casing with the cover, 36, and the securing of the cover against rattling.

Some changes may be made in the construction and arrangement of the parts of my invention without departing from the real spirit and purpose of my invention, and it is my intention to cover by my claims any modified forms of structure or use of mechanical equivalents which may be reasonably included within their scope.

I claim as my invention:

1. In a vehicle signal, a casing, a door hinged to the casing and having at its hinged end an inwardly extending hook, said door being spring-urged toward open position, a lazy tongs structure mounted in the casing, means for extending the lazy tongs beyond the casing, and a finger on the free end of the lazy tongs adapted to engage said hook when the lazy tongs is retracted into the casing to thereby close the door, said finger when the door is closed being engaged between the hook and the door to maintain the latter against vibration.

2. In a vehicle signal, a casing, a lazy tongs structure mounted therein, means for extending and retracting said lazy tongs, a fabric envelope covering said lazy tongs, and means for maintaining said envelope in spaced relation to said lazy tongs, said means including transverse bars carried by the central pivots of the lazy tongs structure, and cords secured to the ends of said bars and to the outer central pivot of the lazy tongs structure in order to maintain said bars in transverse position.

3. In a vehicle signal, a casing, a door hinged to the casing and having at its hinged end an inwardly extending hook, said door being spring-urged toward open position, a lazy tongs structure mounted in the casing, means for extending the lazy tongs beyond the casing, and a finger on the free end of the lazy tongs adapted to engage said hook when the lazy tongs is retracted into the casing to thereby close the door, said finger maintaining its engagement with the hook when the door is closed in order to retain the door against opening.

4. In a vehicle signal, a casing and a lazy tongs structure mounted therein, comprising a plurality of flat bars having integral laterally displaced webs at the end and central portions thereof, spaced to form transverse journals, and spaced so that the webs of one bar will fit within the interspaces of the webs of its adjacent bar when the structure is collapsed, and pintles connecting the bars, said pintles being received through said journals.

5. In a vehicle signal, a casing, an arm mounted in said casing for longitudinal sliding movement and held against lateral movement, a lazy tongs structure having its extreme central pivot secured to the casing and an intermediate central pivot secured to the arm, said arm having a longitudinal slot receiving the extreme central pivot of the lazy tongs.

Signed at Remsen, in the county of Plymouth and State of Iowa, this 11th day of June, 1925.

PAUL C. KLINGBEIL.